(12) United States Patent
Wallner

(10) Patent No.: US 10,167,889 B2
(45) Date of Patent: Jan. 1, 2019

(54) DEVICE AND METHOD FOR HOT-RIVETTING WITH A PLASTIC RIVET AND HOT-RIVETTED PLASTIC RIVET

(71) Applicant: ZF Friedrichshafen AG, Friedrichshafen (DE)

(72) Inventor: Herbert Wallner, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 45 days.

(21) Appl. No.: 15/047,081

(22) Filed: Feb. 18, 2016

(65) Prior Publication Data
US 2016/0243754 A1    Aug. 25, 2016

(30) Foreign Application Priority Data

Feb. 20, 2015    (DE) .................. 10 2015 203 067

(51) Int. Cl.
| | |
|---|---|
| B29C 65/20 | (2006.01) |
| F16B 19/06 | (2006.01) |
| B29C 65/18 | (2006.01) |
| B29C 65/60 | (2006.01) |
| B29C 65/00 | (2006.01) |

(52) U.S. Cl.
CPC .............. *F16B 19/06* (2013.01); *B29C 65/18* (2013.01); *B29C 65/601* (2013.01); *B29C 66/21* (2013.01); *B29C 66/326* (2013.01); *B29C 66/41* (2013.01); *B29C 66/7392* (2013.01); *B29C 66/81423* (2013.01); *B29C 66/81431* (2013.01); *B29C 66/8322* (2013.01)

(58) Field of Classification Search
CPC ... B29C 65/601; B29C 65/602; B29C 65/603; B29C 65/604; B29C 65/606
See application file for complete search history.

(56) References Cited

U.S. PATENT DOCUMENTS

| | | | | |
|---|---|---|---|---|
| 3,324,491 A | * | 6/1967 | Gutshall | ............... B21K 1/463 411/548 |
| 5,737,819 A | * | 4/1998 | Sawdon | ............... B21D 39/035 29/243.5 |
| 2010/0078115 A1 | * | 4/2010 | Lang | ..................... B29C 65/082 156/73.1 |

FOREIGN PATENT DOCUMENTS

| | | | |
|---|---|---|---|
| DE | 20 2007 009 145 U1 | 10/2007 | |
| EP | 2018951 A2 * | 1/2009 | ............... B06B 3/00 |

(Continued)

OTHER PUBLICATIONS

Search Report dated Sep. 24, 2015 for German Patent Application No. 10 2015 203 067.9, (11 pp.), note: pp. 1 and 2 are English language Explanations to Section C. Result of Determination Document.

*Primary Examiner* — Mark A Osele
(74) *Attorney, Agent, or Firm* — Brinks Gilson & Lione

(57) ABSTRACT

The present embodiments are related to a device for hot riveting by using a stud. The device may have a docking surface for the docking against a workpiece and a recess section for the shaping of a sealing head of the plastic stud. The recess section may include a cavity corresponding to the docking surface with a first depth. The device may have a compensation section arranged adjacent to the recess section, the compensation section configured to form an edge section of the plastic stud by accommodating displaced material from the sealing head of the plastic stud. The compensation section may have a second depth in relation to the docking surface, the second depth being less than the first depth.

9 Claims, 4 Drawing Sheets

(56) References Cited

FOREIGN PATENT DOCUMENTS

| | | | | |
|---|---|---|---|---|
| JP | 07004028 A | * | 1/1995 | |
| JP | 2004-262041 A | | 9/2004 | |
| JP | 2004262041 A | * | 9/2004 | ............. B29C 65/08 |
| JP | 2006088415 A | * | 4/2006 | ........... B29C 65/606 |
| JP | 2007001116 A | * | 1/2007 | ............. B29C 65/08 |
| JP | 2008168437 A | * | 7/2008 | ........... B29C 65/606 |
| JP | 2013-215970 A | | 10/2013 | |
| JP | 5708360 B2 | * | 4/2015 | ............. B29C 65/72 |

* cited by examiner

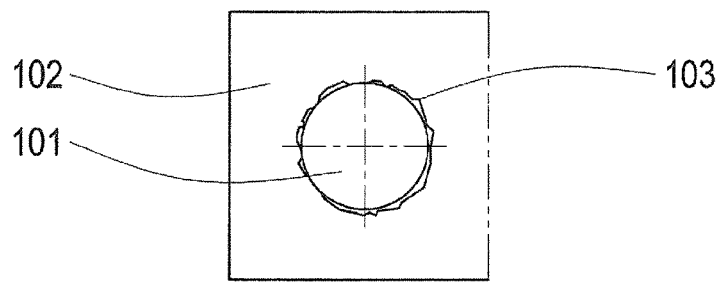
Fig. 1A
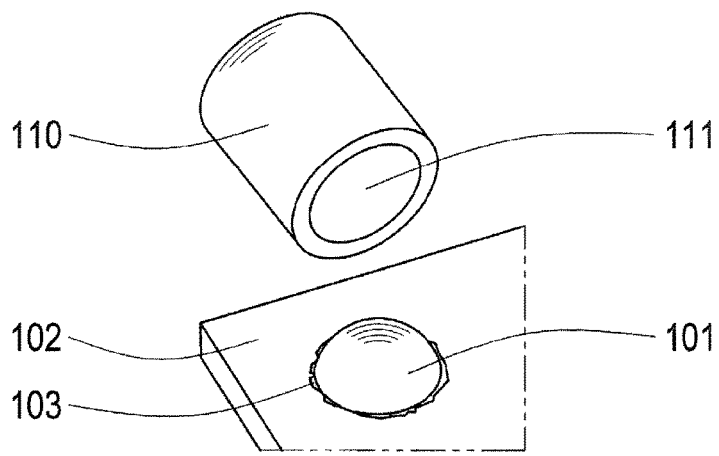
Fig. 1B
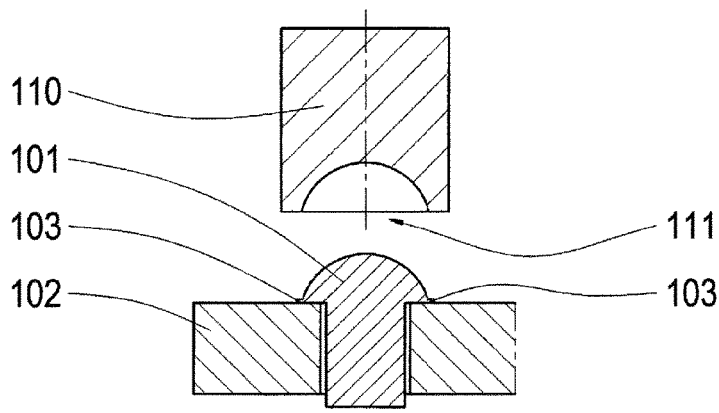
Fig. 1C
Fig. 1D

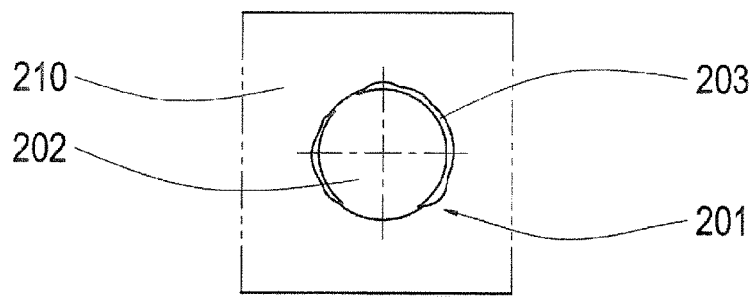
Fig. 2A
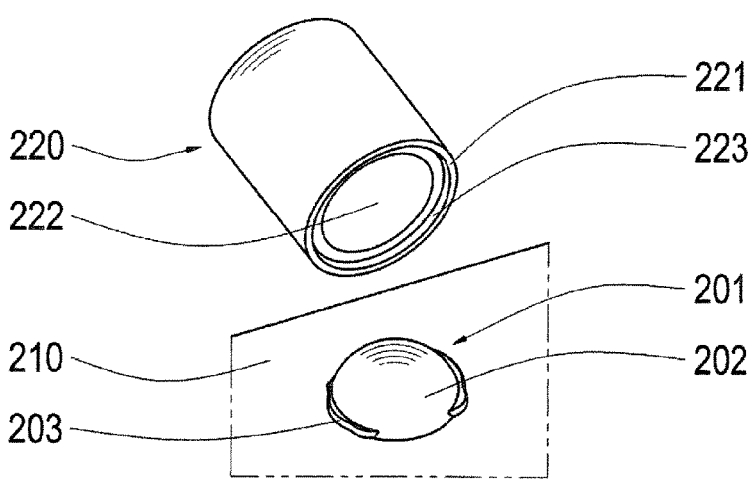
Fig. 2B
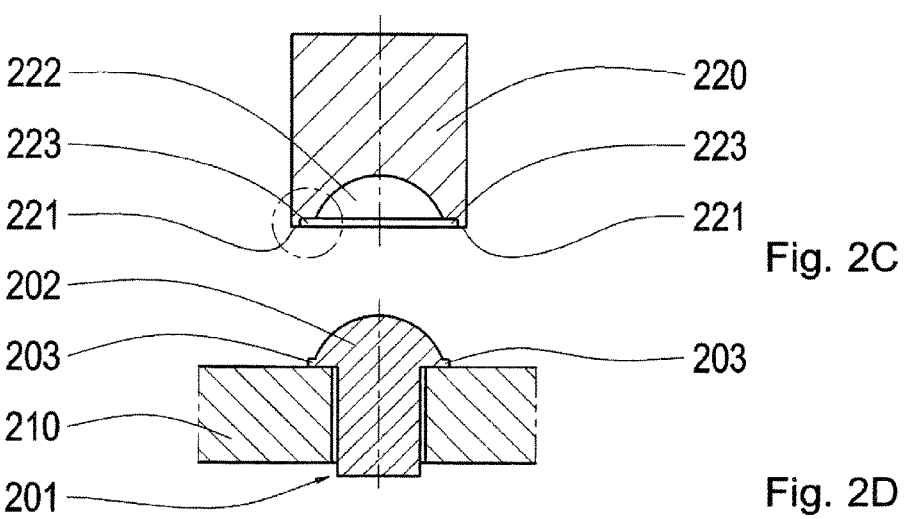
Fig. 2C
Fig. 2D

400 →

DEVICE AND METHOD FOR HOT-RIVETING WITH A PLASTIC RIVET AND HOT-RIVETTED PLASTIC RIVET

CROSS-REFERENCE TO RELATED APPLICATIONS

This current application claims the priority of German Patent Application DE 10 2015 203 067.9, filed on Feb. 20, 2015, which is incorporated by reference herein in its entirety.

BACKGROUND

The present embodiments relate to a device for hot riveting by using a plastic stud, to a procedure for hot riveting by using a plastic stud, as well as to a hot riveted plastic stud, in particular for components in a transmission of a motor vehicle or the like.

In a usual hot riveting operation, it is possible that unwanted ridges arise from excess material, which are forced towards the outside during the hot riveting operation of the plunger or rivet header.

BRIEF DESCRIPTION OF THE DRAWINGS

The current embodiments will be explained in more detail by means of the attached figures.

FIGS. 1A to 1D depict a plastic stud and of a riveting tool;

FIGS. 2A to 2D depict a plastic stud and a device for hot riveting according to an embodiment of the present embodiments;

DETAILED DESCRIPTION

Figure 3A:
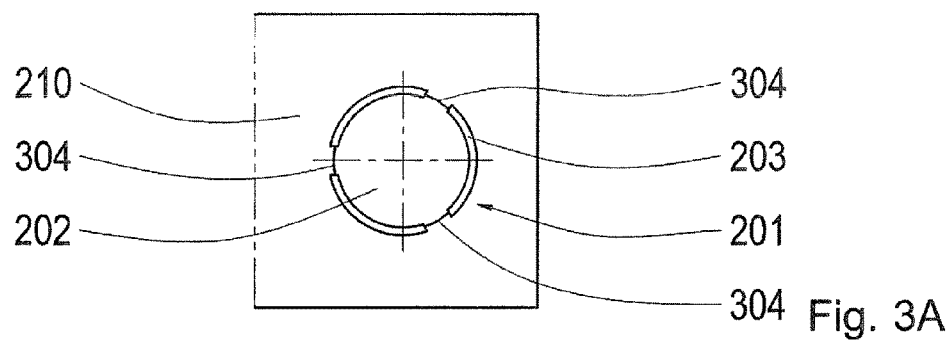
FIGS. 3A to 3D depict a plastic stud and a device for hot riveting according to a further embodiment.

In view of the above, the present embodiments provide an improved device for hot riveting by using a plastic stud, an improved procedure for hot riveting by using a plastic stud, as well as an improved hot riveted plastic stud according to the main claims. Advantageous embodiments are derived from the sub-claims and the following description.

According to embodiments described herein, a volume compensation can be accomplished in particular in connection with hot riveting of plastic studs or plastic domes so that, instead of an undesired ridge, which could loosen, a solid contour or edge section is formed on a produced sealing head of a plastic stud. In other words, according to the embodiments of the present embodiments, it is possible that material which is displaced during the process of shaping a sealing head of a plastic stud is, or will be, shaped into a defined edge section around the sealing head. It is thus particularly possible to create a defined shaping of the plastic material that was displaced during the shaping of the sealing head into an edge section with a defined thickness.

Advantageously, in accordance with the embodiments of the present embodiments, such a volume compensation may, for example, prevent the development of undesired ridges during the shaping of sealing heads of the plastic studs, which could possibly break off. It is possible to accomplish that during the shaping of the sealing heads of the plastic studs, excess material with a defined thickness is displaced but still remains solidly attached to the sealing rivet head. By means of such a solid connection to the sealing head, it is possible to prevent that such excess material will break off during operation. Since it is usually not really possible to prevent the forming of a ridge during the hot riveting process due to tolerances in the components and tools, it is possible that the excess material, which is displaced towards the outside by the riveting tool or by the plunger during the hot riveting operation, which would otherwise form a ridge, is shaped to form a defined edge section by using a defined space for a volume compensation. In other words, it can hereby be prevented that such material with an instable low material thickness could reach between the tool and the fastening part and that a so-called skin film is formed. Thus, hot riveted connections can also be safely used for transmission applications, since it can be securely prevented, that a ridge or a so-called skin film loosens during operation and that particles or residual dirt are thus produced, which would not be permitted in transmission applications.

A device for hot riveting by using a plastic stud consists of a docking surface for the docking against a workpiece and a recess section for the shaping of a sealing head of the plastic stud wherein the recess section has a deepening in relation to the docking surface up to a first depth. The device further consists of a compensation section that is arranged adjacent to the recess section for the forming of an edge section by accommodating the displaced material of the plastic stud from the recess section, whereby the compensation section has a deepening in relation to the docking surface up to a second depth, which is less than the first depth.

The device can represent or consist of a tool or rivet tool similar to that of a rivet header or plunger. When the device with the docking surface is brought to dock against the workpiece, an embodiment of a hot riveting procedure can be performed. The plastic stud can be arranged within an opening that is formed inside the workpiece for the hot riveting. By means of the plastic stud, the workpiece is, or can be, connected to a further workpiece. The plastic stud can consist of a first end with a die head and a second end for the sealing head. Alternatively, the plastic stud can be formed as a blind rivet. For example, the material of the plastic stud can be a thermoplastic material. The device can optionally also consist of a heating unit, which is designed in such a way that the material of the plastic stud is warmed for the shaping of the sealing head and of the edge section, in order to accomplish a plastic deformability of the material. The first depth can represent a maximum depth of the recess section. The second depth can represent a maximum depth of the compensation section. In this way, an area that is forming the recess section can be set backwards with regards to an area that is forming the compensation section. The area that is forming the compensation section can be set backwards with regards to the docking surface. The recess section can be directly adjacent to the compensation section via a ledge. The compensation section can be directly adjacent to the docking surface via a further ledge.

According to an embodiment, the compensation section can extend along at least a partial section of the circumference of the recess section round about the recess section. Such an embodiment has the advantage that displaced material from the plastic stud can be accommodated in a reliable and defined manner. Thus, a development of undesired ridges, which can break off in an uncontrolled way, can be prevented.

The compensation section can thereby be formed in a continuously ring-shaped way. The compensation section can hereby be formed by a deepening or recess in the shape of a flat ring. Such an embodiment has the advantage that a simple accommodation of the material, which was displaced from the plastic stud during the formation, can be facilitated. Thus, the edge section can be formed in a particularly reliable manner.

Alternatively, the ring-shape of the compensation section can be formed with interruptions. The compensation section can hereby be formed by means of a deepening or recess in the shape of at least two segments or a flat ring. Such an embodiment has the advantage that a filling degree of the compensation section can be increased by means of the displaced material, so that the stability can be further increased.

Furthermore, the recess section and the compensation section can be formed as a joined recess. In other words, it is possible that the recess section and the compensation section are part of a combined recess. Such an embodiment has the advantage that the accommodation of the material that was displaced during the shaping of the sealing head can be facilitated in an even more reliable manner.

In particular, the second depth can be at least 0.1 mm, at least 0.2 mm or at least 0.3 mm. Such an embodiment has the advantage that by means of such a compensation section it is possible to form a particularly stable edge section, which is solidly attached to the sealing head.

The recess section can also be formed in a dome-shaped way up to the first depth. This compensation section can thereby be shaped uniformly up to the second depth. Thus, the compensation section can consistently feature the second depth. Alternatively, the compensation section can be shaped in an inconsistent or irregular way up to the second depth. Such an embodiment has the advantage that the compensation section in the device can be formed in a particularly simple manner.

A hot riveted plastic stud, onto which a sealing head is shaped, features an edge section, which is adjacent to the sealing head that is formed in one piece with the sealing head, whereby the edge section features a thickness of at least 0.1 mm, at least 0.2 mm or at least 0.3 mm in at least some portion of the section.

The hot riveted plastic stud can be provided by using the above-mentioned device for hot riveting. The hot riveted plastic stud can feature the sealing head and the edge section.

According to one embodiment, the sealing head can be formed in a dome-shape. Hereby it is possible that the edge section is at least partially formed in a flat ring shape. Such an embodiment has the advantage that this kind of shape of the hot riveted plastic stud features an increased stability and that it is easy to produce.

A procedure for hot riveting by using a plastic stud, wherein the procedure can be performed by means of an embodiment of the above-mentioned device for hot riveting, comprises a step to shape a sealing head of the plastic stud and an edge section that is made of material that was displaced from the sealing head, whereby the edge section is formed in one piece along with the sealing head, whereby the edge section is formed at least partially with a thickness of at least 0.1 mm, at least 0.2 mm or at least 0.3 mm.

The procedure can be preferably performed in connection with or by means of an embodiment of the above-mentioned device for hot riveting, in order to at least attach a plastic stud for hot riveting with the workpiece or to use it for a connection of the workpiece. By means of performing the procedure, it is possible to provide an embodiment of the above-mentioned hot riveted plastic stud.

In the following description of the preferred embodiments of the present embodiments, the depicted elements in the different figures that are functioning in a similar way are referred to with the same or with similar reference signs, whereby a repeated description of these elements is omitted.

FIG. 1A shows a top view onto a sealing head of a plastic stud 101, which is hot riveted with a workpiece 102. The sealing head of the plastic stud 101 is surrounded by a ridge 103, which stems from a hot riveting operation. In a common hot riveting operation, excess material is leaking out in an undefined manner, whereby ridge 103 is formed, which can break off. Ridge 103 reaches a thickness or strength of, for example, 0.05 mm.

FIG. 1B shows a perspective view of plastic stud 101 with ridge 103, as well as workpiece 102 from FIG. 1A, whereby FIG. 1B also shows a rivet tool 110 with a plunger section 111 for shaping the sealing head of plastic stud 101. Riveting tool 110 is hereby set at a distance to workpiece 102 with the plastic stud.

FIG. 1C shows a sectional view through the riveting tool 110 of FIG. 1B. Here, plunger section 111 of riveting tool 110 is also shown, which features a circular sectional profile.

FIG. 1D shows a sectional view through plastic stud 101 and workpiece 102 of FIG. 1A. In it, ridge 103 is also shown on both sides of the sealing head of plastic stud 101.

FIG. 2A shows a top view onto a hot riveted plastic stud 201 according to the present embodiments. Based on this view, FIG. 2A shows a sealing head 202 and an edge section 203 of the hot riveted plastic stud 201. Plastic stud 201 is arranged within a workpiece 210. Thus, FIG. 2A shows the hot riveted plastic stud 201 in a state where plastic stud 201 is placed into workpiece 210.

After a riveting operation, sealing head 202 is formed onto the hot riveted plastic stud 201. According to the embodiment as shown in FIG. 2A, sealing head 202 is hereby formed with a circular base. Even if it is only implied in FIG. 2, it can be seen that sealing head 202 is formed with a dome-shape.

Plastic stud 201 also features edge section 203, which is arranged adjacent to sealing head 202 and which is formed in one piece along with sealing head 202. Edge section 203 is formed at least partially in the shape of a flat ring. Edge section 203 is hereby arranged in such a way that it completely surrounds sealing head 202. In the depiction of FIG. 2A, edge section 203 features an outer edge with an irregular course. Even if it is not explicitly shown in FIG. 2A, at least some portions of edge section 203 reach a thickness of about 0.3 mm.

FIG. 2B shows a perspective view of the hot riveted plastic stud 201 with sealing head 202 and edge section 203, as well as workpiece 210 of FIG. 2A, whereby FIG. 2B shows an additional hot riveting device 220 according at least one embodiment. The hot riveting device 220 is hereby shown at a distance from plastic stud 201 and from workpiece 210. In FIG. 2B it can be clearly seen that sealing head 202 of plastic stud 201 is formed in a dome-shaped way.

The hot riveting device 220 is designed for hot riveting or for performing a hot riveting operation by using a plastic stud, for example, by using the plastic stud 201. In other words, FIG. 2B shows plastic stud 201 after the hot riveting operation was carried out by using the hot riveting device 220. The hot riveting device 220 consists of a docking surface 221, a recess section 222 and a compensation section 223. In the following, the hot riveting device 220 will be dealt with in more detail with reference to FIG. 2C.

FIG. 2C shows a sectional view of the hot riveting device 220 of FIG. 2B. In FIG. 2C, the docking surface 221, the recess section 222 and the compensation section 223 of the hot riveting device 220 are shown in more detail.

Docking surface 221 is designed in such a way that it can be brought in direct contact to a workpiece during a hot riveting operation, such as the workpiece of FIG. 2A or FIG. 2B. Hereby, docking surface 221 surrounds the recess section 222 and the compensation section 223.

Recess section 222 is designed to shape the sealing head of the plastic stud. Hereby, recess section 222 has a deepening in relation to the docking surface 221 up to a first depth. According to the embodiment as shown in FIG. 2B or FIG. 2C, recess section 222 has a dome-shaped form.

Compensation section 223 is arranged adjacent to recess section 222. Strictly speaking, the compensation section 223 is arranged between recess section 222 and docking surface 221. The compensation section 223 is designed to form the edge section of the plastic stud. Precisely speaking, the compensation section 223 is designed to form the edge section of the plastic stud by accommodating material from the plastic stud, which has been displaced from the recess section. In other words, the compensation section 223 acts as an overflow for excess material or material that was displaced during the forming of the sealing head. Compensation section 223 has a deepening in relation to docking surface 221 up to a second depth, which is less than the first depth.

According to the embodiment shown in FIG. 2B or FIG. 2C, recess section 222 and compensation section 223 of hot riveting device 220 are formed as a joined recess. In the sectional view of FIG. 2C, this joined recess features almost the shape of a Saturno or of a hat called Cappello romano with a shortened brim, whereby compensation section 223 is representing the shortened brim. Recess section 222 hereby has a dome-shaped form up to the first depth and compensation section 223 is uniformly cut out up to the second depth. For example, according to embodiment in FIG. 2B or FIG. 2C, the first depth amounts to about 2.5 mm and the second depth to about 0.3 mm.

According to one embodiment, compensation section 223 extends at least along a partial section of a circumference of recess section 222 round about the recess section 222. According to the embodiment shown in FIG. 2B or FIG. 2C, compensation section 223 is formed in a continuously ring-shaped way and extends around the entire circumference round about the recess section 222.

In the cross-sectional view of FIG. 2C, an end portion of the device 220, which is facing towards the workpiece during operation of device 220 is shown with a step-like profile. Docking surface 221 is designed as a flat surface. Compensation section 223 connects to docking surface 221. According to an embodiment, compensation section 223 is formed by a flat surface that is recessed in relation to docking surface 221. In accordance with one embodiment, the plane surface of compensation section 223 is aligned parallel to docking surface 221. Docking surface 221 and equalization section 223 are interconnected by means of a step-shaped e.g. rectangular or beveled ledge. Compensation section 223 is arranged between docking surface 221 and recess section 222. Recess section 222 is formed by a curved surface that is recessed in relation to the compensation section 223. Thus, recess section 222 connects to compensation section 223 in a step-shaped way.

FIG. 2D shows a sectional view through plastic stud 201 and workpiece 210 of FIG. 2A or FIG. 2B. The sealing head 202 and edge section 203 of the plastic stud 201 are also shown. In the sectional view of FIG. 2D it can be seen that sealing head 202 and edge section 203, which are formed in one piece, feature a sectional profile that is almost in the shape of a Saturno or of a hat called Cappello romano with a shortened brim, whereby edge section 203 is representing the shortened brim. Edge section 203 is formed by material that was displaced or that is in excess during the shaping of sealing head 202, and which was pushed out in an undefined way with a thickness of, for example, 0.3 mm, and it is solidly attached to sealing head 202.

FIG. 3A shows a top view onto a hot riveted plastic stud 201. The representation in FIG. 3A and the plastic stud 201 correspond to the depiction in FIG. 2A and to the plastic stud that is shown therein with the exception that the edge section 203 in FIG. 3A is formed in the shape of an interrupted flat ring. Here, edge section 203 is arranged in such a way that it partially surrounds the circumference of sealing head 202. According to the embodiment shown, the edge section 203 in FIG. 3A is interrupted at three voids 304 along the circumference of sealing head 202. Outside of the voids 304, edge section 203 features at least partly a thickness of about 0.3 mm, even if the depiction in FIG. 3A does not explicitly show this.

Figure 3B:
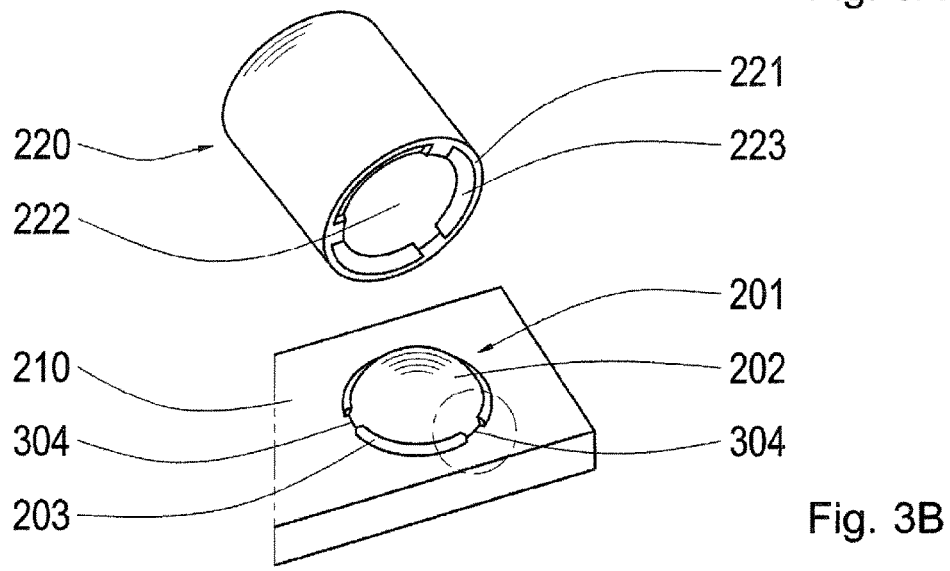

FIG. 3B shows a perspective view of the hot riveted plastic stud 201 with sealing head 202 and edge section 203, as well as workpiece 210 from FIG. 3A, whereby FIG. 3B shows an additional hot riveting device 220. The hot riveting device 220 corresponds to the hot riveting device from FIG. 2B with the exception that compensation section 223 is formed in a ring-shape with interruptions. The interrupted ring-shaped compensation section 223 is formed in order to create the edge section 203 that is shown in FIG. 3A, which is interrupted by the voids 304.

Figure 3C:
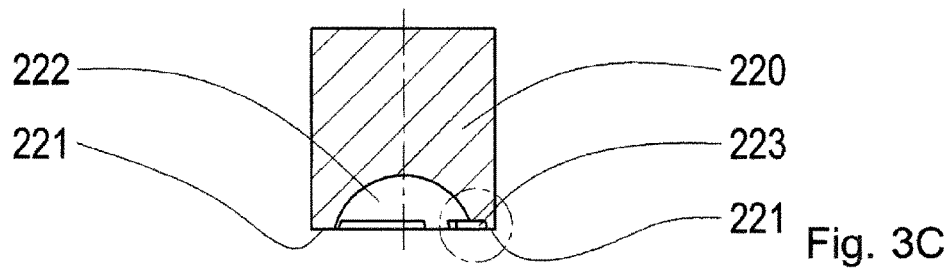

FIG. 3C shows a sectional view through the hot riveting device 220 from FIG. 3B. Hereby, the depiction in FIG. 3C and the hot riveting device 220 correspond with the depiction in FIG. 2C and with the hot riveting device shown therein, except that the compensation section 223 only partially extends around recess section 222. According to the embodiment shown in FIG. 3B or FIG. 3C, the compensation section 223 is formed in a ring-shaped way with interruptions and it is designed to form the edge section of the plastic stud, which is interrupted by the voids, as it is shown in FIG. 3A. Thus, compensation section 223 functions only along a portion of the circumference of recess section 222 as an overflow for the displaced material. At three locations, which, for example, serve for the forming of the voids, compensation section 223 is interrupted according to the embodiment shown in FIG. 3B or FIG. 3C.

Figure 3D:
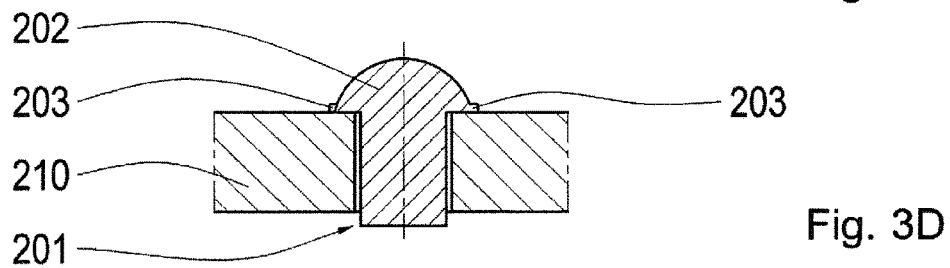

FIG. 3D shows a sectional view through plastic stud 201 and workpiece 210 of FIG. 3A or FIG. 3B. Hereby, the depiction in FIG. 3D corresponds with the depiction in FIG. 2D, due to a selected section plane of it.

With reference to the FIGS. 2A to 3D, the hot riveting device 220 features a compensation section 223 as an area for a volume compensation. The compensation section 223 is hereby formed, for example, as a compensation groove, into which material with a defined height can flow, or as an area that is at least partially circulating around recess section 202 with a depth of, for example, about 0.3 mm for a volume compensation. Thus, it is possible to prevent that the excess material exits as a ridge, and it can be ensured that a defined edge section 203 with a height or thickness of, for example, about 0.3 mm is formed, which is solidly connected to the sealing head 202.

Figure 4:
FIG. 4 depicts a flow chart of a procedure for adjusting according to a further embodiment.

FIG. 4 shows a flow chart of a procedure 400 for hot riveting according. This procedure 400 can be performed for hot riveting by using a plastic stud. Procedure 400 can hereby be performed by using a device for hot riveting, as well as a plastic stud from one of the FIGS. 2A to 3D.

Procedure 400 includes a step 410 for the shaping of a sealing head of the plastic stud and of an edge section that is made of the material that was displaced from the sealing head of the plastic stud. Hereby, step 410 for the shaping is performed in such a way that the edge section is formed in one piece with the sealing head. In particular, the edge section is hereby formed at least in a partial section with a thickness of at least 0.1 mm, at least 0.2 mm or at least 0.3 mm.

The embodiments described and shown in the figures are chosen only by way of an example. Different embodiments may be combined with each other as a whole or with reference to individual features. It is also possible to supplement an embodiment by features of another embodiment. It is further possible that steps of the procedure can be repeated or performed in a sequence that is different than the one described.

If an embodiment includes an "and/or" connection between a first characteristic and a second characteristic, this can be understood in such a way that the design example according to one embodiment features the first characteristic, as well as the second characteristic, and according to a further embodiment either only the first characteristic or only the second characteristic.

REFERENCE SIGNS 101 plastic stud
102 workpiece
103 ridge
110 hot riveting tool
111 plunger section
201 hot riveted plastic stud
202 sealing head
203 edge section
210 workpiece
220 hot riveting device or device for hot riveting
221 docking surface
222 recess section
223 compensation section
304 void
400 procedure for the hot riveting
410 step for the shaping

I claim:

1. A device for hot riveting by using a plastic stud, the device comprising:
    a docking surface for docking against a workpiece;
    a recess section for shaping a sealing head of the stud, wherein the recess section includes a cavity, and wherein the cavity has a first depth in relation to the docking surface; and
    a compensation section that is arranged adjacent to the recess section, the compensation section configured to form an edge section of the stud by accommodating displaced material from the sealing head of the stud,
    wherein the compensation section is uniform with a second depth in relation to the docking surface, the second depth being less than the first depth,
    wherein the docking surface surrounds the entirety of the compensation section and is fixed with respect to the compensation section,
    wherein at least one protrusion interrupts the compensation section, and
    wherein the at least one protrusion partially forms the docking surface.

2. The device of claim 1, wherein the compensation section extends at least along a partial section of a circumference of the recess section.

3. The device of claim 1, wherein the compensation section has a ring-shaped form that is interrupted by the at least one protrusion.

4. The device according to claim 3, wherein the at least one protrusion is configured to form at least one void of the edge section of a stud.

5. The device of claim 1, wherein both the recess section and the compensation section are formed in a recess.

6. The device of claim 1, wherein the second depth is at least 0.1 mm.

7. The device of claim 1, wherein the recess section includes a dome-shaped form up to the first depth and the compensation section is uniformly shaped up to the second depth.

8. The device of claim 1, wherein the second depth is at least 0.2 mm.

9. The device of claim 1, wherein the second depth is at least 0.3 mm.

* * * * *